United States Patent [19]

Schwarz et al.

[11] Patent Number: 4,802,384
[45] Date of Patent: Feb. 7, 1989

[54] PROCEDURE FOR SHIFTING A TRANSMISSION COMPOSED OF SEVERAL GEAR UNITS

[75] Inventors: Reinhard Schwarz, Gondelsheim; Heinz Stuhrmann, Schwetzingen; Dieter Nobis, Lonsee-Halzhausen, all of Fed. Rep. of Germany

[73] Assignee: Deere & Company, Moline, Ill.

[21] Appl. No.: 103,481

[22] Filed: Sep. 30, 1987

[30] Foreign Application Priority Data

Oct. 1, 1986 [DE] Fed. Rep. of Germany ....... 3633372

[51] Int. Cl.$^4$ .......................... F16H 3/02; B60K 20/10
[52] U.S. Cl. .......................................... 74/745; 74/335
[58] Field of Search ..................... 74/740, 745, 335

[56] References Cited

U.S. PATENT DOCUMENTS

| | | | |
|---|---|---|---|
| 3,583,257 | 8/1971 | Peterson | 74/745 |
| 3,886,815 | 6/1975 | Eastwood | 74/745 |
| 3,939,722 | 2/1976 | Stromberg | 74/745 X |
| 3,944,035 | 3/1976 | McRay | 74/745 |
| 3,945,265 | 3/1976 | Bell et al. | 74/745 X |
| 4,060,005 | 11/1977 | Bost | 74/745 |
| 4,388,843 | 6/1983 | Teeter | 74/745 |
| 4,579,015 | 4/1986 | Fukui | 74/335 X |
| 4,685,343 | 8/1987 | Ehrlinger et al. | 74/331 |

FOREIGN PATENT DOCUMENTS

| | | |
|---|---|---|
| 1188449 | 4/1961 | Fed. Rep. of Germany . |
| 2633730 | 3/1977 | Fed. Rep. of Germany . |
| 3012661 | 10/1980 | Fed. Rep. of Germany . |
| 85/01335 | 3/1985 | PCT Int'l Appl. . |
| 1596830 | 9/1981 | United Kingdom . |

Primary Examiner—Dirk Wright

[57] ABSTRACT

A procedure for shifting a transmission composed of several gear units in which a number of synchronizer linkages are provided, is so designated that during a gear ratio change in the last gear unit, that is in that unit to which the speed of all preceding gear units must be brought, all shift linkages are initially released. Following this, the shift linkages are re-established beginning with the last gear unit. By this means unnecessary rotating inertias are decoupled, and the shift linkages, and particularly any synchronizing devices, can be reduced in size.

3 Claims, 1 Drawing Sheet

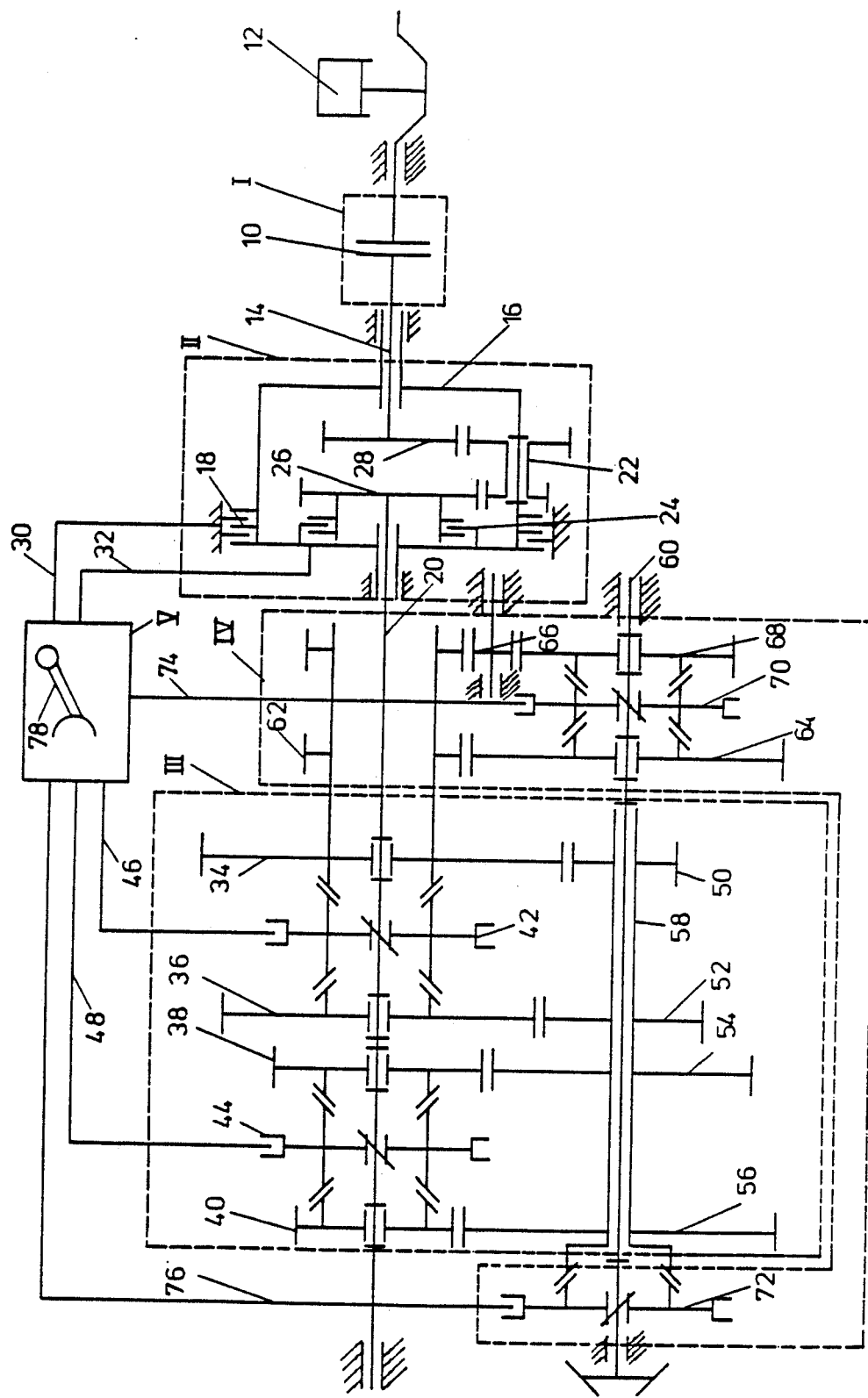
U.S. Patent  Feb. 7, 1989  4,802,384

PROCEDURE FOR SHIFTING A TRANSMISSION COMPOSED OF SEVERAL GEAR UNITS

BACKGROUND OF THE INVENTION

1. Field of the Invention

The invention concerns a procedure for shifting a transmission composed of several gear units, where a first gear unit, e.g., a reduction gear unit, is connected to an engine and a last gear unit, e.g., a range gear unit, is connected to an output shaft for a driven part, in particular wheels, and where between the first and the last gear unit at least one second gear unit, e.g., a speed change gear unit, is provided.

2. Description of the Related Art

U.S. Pat. No. 4,318,305 (Wetrich et al.) teaches a transmission having several gear units. A first gear unit provides either direct drive or a speed reduction and can be shifted hydraulically. A second gear unit is a speed change gear unit which can be synchronized and shifted mechanically. A last gear unit is arranged on the output shaft and forms a range gear unit which can be shifted mechanically, but is not synchronized. Each gear unit can be shifted independently of the others, so that a large number of gear ratios can be obtained.

This transmission arrangement can be improved since it does not permit simple shifting of the last gear unit, that is, the range gear unit, because it does not have synchronizers. Unfortunately, due to the large rotational inertia ahead of the range gear unit, very large synchronizers normally would be required to provide synchronized range gear shifting. The problem underlying this invention is seen as providing the possibility of shifting the range gear unit easily and rapidly, but without the expense of adding large synchronizers.

SUMMARY OF THE INVENTION

This problem has been solved according to the present invention, which provides that during a shift in the last gear unit, the associated synchronizers in the intermediate speed change gear unit are released and the synchronizers are then progressively actuated working backwards from the last gear unit.

By this means, the gear units preceding from the last gear unit are successively brought up to the rotational speed of the last gear unit, which cannot be varied. This will avoid an excessively high speed equalization in any one gear unit relative to any adjacent gear unit, so that relatively lightweight synchronizers can be used.

In particular, during a shift from forward to reverse, in which the entire gear train must be brought to a standstill, an optimum equalization of rotational speed is made possible. If required, a penultimate or more central gear unit may be considered equivalent to the last gear unit upon which the rotational speed of all the other gear units must be synchronized, if that gear unit is the origin of the invariable rotational speed upon which all others must be synchronized.

A reduction in the time required for shifting is obtained when not just one, but all shift linkages are synchronized. If synchronizers are not present in a gear unit, it nevertheless is advantageous to release the gear unit in order to uncouple as much rotating inertia as possible and minimize its effect upon the synchronized process.

While this shifting sequence could be performed manually, optimization of the shifting process is obtained when the shift is performed automatically and uses pneumatic, electrical or hydraulic systems.

BRIEF DESCRIPTION OF THE DRAWING

The drawing shows a schematic of a transmission with a shifting arrangement by means of which the procedure of this invention may be performed, and which is described in greater detail in the following. As the drawing shows, the transmission is divided into five groups (I–V), where I designates a clutch, II a reduction gear unit that may be shifted under load, III a speed change gear unit with four gear ratios, IV a range gear unit, and V a shift control unit.

DETAILED DESCRIPTION OF THE PREFERRED EMBODIMENT

The clutch I contains two clutch halves 10, one of which is connected to an engine 12 and the other of which is connected to the input shaft 14 of the reduction gear unit II. The clutch I may be configured as a conventional friction clutch with mechanical actuation or as a hydraulically actuated multi-disk clutch. It normally is actuated each time that a shift is performed in either the speed change gear unit III or the range gear unit IV.

The reduction gear unit II includes a planetary carrier 16 which may be locked to a frame or similar member by means of a multi-disk brake 18, but which is otherwise free to rotate, an output shaft 20, a set of double planetary gears 22 which are supported by bearings in the carrier 16 and are free to rotate, and a multi-disk clutch 24. An output gear 26 is mounted on and for rotation with the output shaft 20. The output gear 26 meshes with the double gears 22 on the one hand, while on the other, it locks the output shaft 20 to the carrier 16 by means of the multi-disk clutch 24 when correspondingly controlled. At their other ends, the double gears 22 mesh with the input gear 28, which is locked to the input shaft 14 and which has a smaller diameter than the output gear 26. The multi-disk brake 18 is operated by means of a control line 30 and the multi-disk clutch 24 is operated by means of a control line 32, both operably connected to the shift control unit V to permit shifting of the reduction gear unit II from direct drive to a reduced gear ratio. In direct drive, the output shaft 20 and the output gear 26 are connected rigidly to the carrier 16 by means of the multi-disk clutch 24 and the multi-disk brake 18 is released, so that the double gears 22 are locked and serve merely as a rigid connection between the input gear 28 and the output gear 26. Thus, no speed reduction of the input shaft 14 is performed.

In the speed reduction mode, the multi-disk brake 18 is applied so that the carrier 16 is locked against rotation, while the multi-disk clutch 24 is opened, permitting relative motion between the output gear 26 and the carrier 16. In this case, the rotational speed of the input shaft 14 is reduced by means of the double gears 22.

In the example of the invention, the speed change gear unit III contains four gears 34, 36, 38 and 40, each with a different diameter, which are supported by bearings on the output shaft 20 of the reduction gear unit II, and which may be locked to that shaft by synchronizers 42 (for the gears 34 and 36) and 44 (for the gears 38 and 40). The synchronizers 42, 44 are controlled by means of shifting linkage 46, 48 from the shift control unit V. These four gears 34 through 40 mesh with four gears 50, 52, 54 and 56 which are rigidly connected to each other by a hollow shaft 58. The shaft 58 is supported in bearings to be free to rotate as a unit about the output shaft 60, which supplies power to the wheels of a motor vehicle, not shown here. Depending upon which of the gears 34 through 40 is locked to the output shaft 20 by means of the synchronizers 42, 44, a greater or a lesser speed reduction of the output shaft 60 will be obtained.

The range gear unit IV contains a double gear 62 which is locked against rotation to the gear 34 on the output shaft 20 of the reduction gear unit II. The double gear 62 is also in constant mesh with a slow speed gear 64 and a reverse idler gear 66. The reverse idler gear 66 serves merely to reverse the direction or rotation and is in constant mesh with the reverse gear 68. The slow speed gear 64 and the reverse gear 68 are supported in bearings so as to be free to rotate on the output shaft 60 and may be locked to the output shaft 60 by synchronizer 70. In addition the hollow shaft 58 may be locked to the output shaft 60 by a synchronizer 72. Synchronizer 70 is actuated by a control line 74, and synchronizer 72, by a control line 76, from the shift control unit V.

The shift control unit V may be configured in any manner, but it would be useful to provide a shift lever 78 which can initiate the operations described below in changing the gear ratios in the speed control gear unit III and the multi-function geaar unit IV by means, e.g., of an electric control circuit, not shown, in the shift control unit V. Such circuits are well known to one of ordinary skill in the art and will not be described here.

OPERATION

The general operation of the reduction, speed change, and range gear units II, III, IV and their detailed arrangement may be found in U.S. Pat. No. 4,318,305 (Wetrich et al.), which is incorporated herein by reference. As taught in that reference, the reduction gear unit II will selectively reduce the speed of the input shaft 14 by about 20%, which is carried through to the output shaft 60. The range gear unit IV performs either a reversal or a greater speed reduction of the gear ratios established in the speed change gear unit III. Thus the speed change gear unit III creates intermediate gear ratios within the limits of the ratios established by the range gear unit IV. Shifting operations solely within in the speed change gear unit III and the reduction gear unit II take place as described in U.S. Pat. No. 4,318,305, and hence are not described again herein.

According to the present invention, the shift control unit V is so designed that when the gear ratio in the range gear unit IV is to be changed, the synchronizers in the range gear unit IV are released. In addition, the synchronizers 42, 44 are released from the gears that they control in the speed change gear unit III. If necessary, the multi-disk brake 18 and the multi-disk clutch 24 may be released so that no power is transmitted through the reduction gear unit II. Subsequently, either the hollow shaft 58, the slow speed gear 64 or the reverse gear 68 are connected to the output shaft 60 by the appropriate synchronizer 70 or 72. Once this connection is made, a speed ratio is established in the speed change gear unit III by engaging one of the synchronizers 42 or 44. The multi-disk brake 18 or the multi-disk clutch 24 in the reduction gear unit II then is engaged, provided both had previously been released. Finally, re-engaging the clutch I will re-establish the flow of power from the engine 12 to the wheels.

An example of such a shift in gear ratios in the range gear unit IV begins with the reduction gear unit II in direct drive, the speed change gear unit II in its lowest ratio, and the range gear unit IV in the slow speed gear, which is the lowest possible (creeping) speed ratio. This means that the multi-disk clutch 24 is engaged, that the gear 40 is locked to the output shaft 20 by synchronizer 44, that the gear 56 engages the hollow shaft 58 and that the hollow shaft 58 is connected to the output shaft 60 by means of the gear 50, the gear 34, the double gear 62, the slow speed gear 64 and synchronizer 70. This condition represents a first direct slow speed gear ratio.

Assume that a first direct reverse gear ratio is now to be engaged.

For this, the clutch I is first disengaged. Following this, the shift lever 78 is brought into the position corresponding to the first direct reverse gear ratio, so that the shift control unit V can accomplish the required shift procedure. For this, synchronizers 44 and 70 are disengaged from the gear 40 and the slow speed gear 64. If desired, the multi-disk clutch 24 in the reduction gear unit II may also be released. After all these power transmission linkages have been broken, the vehicle will roll to a stop and the output shaft 60 preferably will be braked. The output shaft 60 is connected directly to the wheels of the vehicle, hence its rotational speed is the invariable speed to which the components of the reduction unit, the speed change gear unit and the reduction gear unit must be brought. After the output shaft 60 has stopped, the reverse gear 68 is connected to the output shaft 60 by synchronizer 70. Synchronizer 44 then is moved so as to lock the gear 40 to the output shaft 20. If the multi-disk clutch 24 has been opened, it is now re-engaged. Finally, the clutch I is re-engaged, so that power flows to the wheels through the clutch I, the input gear 28, the carrier 16, the output shaft 20, the gear 40, the gear 56, the hollow shaft 58, the gear 50, the gear 34, the double gear 62, the reverse idler gear 66, the reverse gear 68 and the output shaft 60. During engagement of the clutch I, speed synchronization of the engine 12 is accomplished and reverse movement can begin.

The advantage of this shifting procedure lies in the fact that the rotating inertia, which in each case is decoupled, will lower the torques that are imposed upon the synchronizers 42, 44, 70 and 72. Small synchronizers therefore can be used, so that even with little space available in the housing of the gear unit easy shifting of gear ratios can be accomplished.

We claim:
1. A process for shifting a transmission having:
   (i) a first gear unit drivably connectible to an engine;
   (ii) a last gear unit having at least one synchronizer to drivingly connect the last gear unit to at least one driven component;
   (iii) at least one intermediate gear unit releasably connecting said first and last gear units,
the process comprising:
   (i) releasing said at least one synchronizer and said at least one intermediate gear unit;
   (ii) connecting said at least one synchronizer;
   (iii) connecting said at least one intermediate gear unit.

2. The process of claim 1, wherein said step (i) further comprises releasing said first gear unit and said process comprises an additional step (iv) of connecting said first gear unit.

3. The process of claim 1, wherein the shifting operation is performed automatically.

* * * * *